(12) United States Patent
Faitelson et al.

(10) Patent No.: US 8,782,027 B2
(45) Date of Patent: Jul. 15, 2014

(54) METHOD AND APPARATUS FOR AUTHENTICATION OF FILE READ EVENTS

(75) Inventors: Yakov Faitelson, Elkana (IL); Ohad Korkus, Herzeliya (IL); David Bass, Karmei Yosef (IL); Yzhar Kaysar, Kohav Yair (IL); Doron Goldstein, Rishon Lezion (IL); Oren David, Kfar-Saba (IL)

(73) Assignee: Varonis Systems, Inc. NY (US)

( * ) Notice: Subject to any disclaimer, the term of this patent is extended or adjusted under 35 U.S.C. 154(b) by 109 days.

(21) Appl. No.: 13/356,658

(22) Filed: Jan. 24, 2012

(65) Prior Publication Data

US 2013/0191358 A1 Jul. 25, 2013

(51) Int. Cl.
*G06F 17/30* (2006.01)

(52) U.S. Cl.
USPC .............................. 707/705; 726/22; 726/24

(58) Field of Classification Search
CPC .... G06F 11/30; G06F 17/30144; G06F 17/30
USPC .................. 707/705, E17.001; 726/22, 24, 1
See application file for complete search history.

(56) References Cited

U.S. PATENT DOCUMENTS

| | | | | |
|---|---|---|---|---|
| 6,405,318 | B1 * | 6/2002 | Rowland | 726/22 |
| 6,647,400 | B1 * | 11/2003 | Moran | 1/1 |
| 7,487,546 | B1 * | 2/2009 | Szor | 726/25 |
| 8,352,522 | B1 * | 1/2013 | Cheng | 707/827 |
| 2002/0046275 | A1 * | 4/2002 | Crosbie et al. | 709/224 |
| 2002/0156946 | A1 | 10/2002 | Masters | |
| 2003/0084329 | A1 * | 5/2003 | Tarquini | 713/200 |
| 2005/0125608 | A1 | 6/2005 | Grimsrud et al. | |
| 2006/0112096 | A1 | 5/2006 | Ahluwalia | |
| 2007/0094265 | A1 * | 4/2007 | Korkus | 707/9 |
| 2007/0107052 | A1 * | 5/2007 | Cangini et al. | 726/22 |
| 2008/0060051 | A1 * | 3/2008 | Lim | 726/1 |
| 2009/0013408 | A1 * | 1/2009 | Schipka | 726/24 |
| 2010/0115614 | A1 * | 5/2010 | Barile et al. | 726/22 |
| 2012/0246303 | A1 * | 9/2012 | Petersen et al. | 709/224 |

* cited by examiner

*Primary Examiner* — Shahid Alam
*Assistant Examiner* — Evan Aspinwall
(74) *Attorney, Agent, or Firm* — Soroker Agmon

(57) ABSTRACT

A computerized method and apparatus for distinguishing between false positive read events and true positive events of reading a file, comprising determining an amount of date read from the file, in case the amount of data exceeds a threshold generating a true positive read event, otherwise generating a false positive read event in case a decision condition is met, and an apparatus to carry out the same.

6 Claims, 2 Drawing Sheets

METHOD AND APPARATUS FOR AUTHENTICATION OF FILE READ EVENTS

BACKGROUND

The present disclosure generally relates to accessing files in a computer system, and more specifically to file read events.

Monitoring file accesses in a computer system is known in the art.

For example, Process Monitor for Windows® that shows real-time file system, registry and process/thread activity, or Inotify in Linux® that monitors file system operations, such as read, write, and create.

SUMMARY

One exemplary embodiment of the disclosed subject matter is a method for computerized method for distinguishing between false positive read events and true positive events of reading a file, comprising determining an amount of data read from the file; in case the amount of data read from the file exceeds a threshold generating a true positive read event, otherwise generating a false positive read event in case a decision condition is met.

Another exemplary embodiment of the disclosed subject matter is a computerized method for distinguishing between false positive read events and true positive events of reading a file, comprising:

generating a true positive read event if sequential segments of the file were read, otherwise generating a false positive read event.

Yet another exemplary embodiment of the disclosed subject matter is a computerized apparatus for distinguishing between false positive read events and true positive events of reading a file, comprising:

a data storage device storing the file therein;

a controller linked to the data storage device, the controller configured to generate false positive read events and true positive events of reading the file responsive to an amount of data read from the file.

In the context of the present disclosure, without limiting, the terms 'true positive read' event, 'true read' event or 'true' event are used interchangeably, and similarly the terms 'false positive read' event, 'false read' event or 'false' event are used interchangeably.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described.

Figure 1:
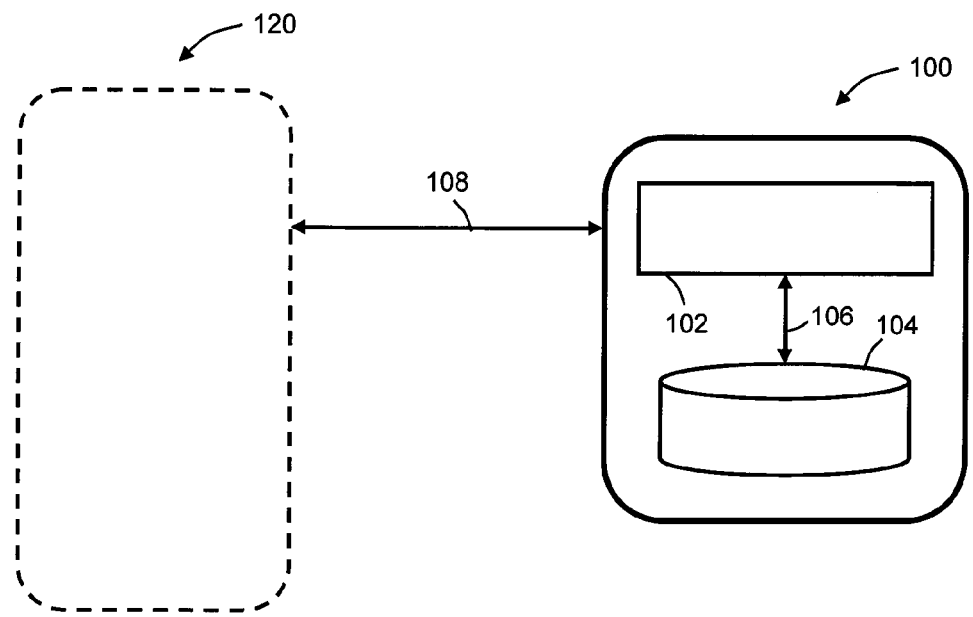

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2:
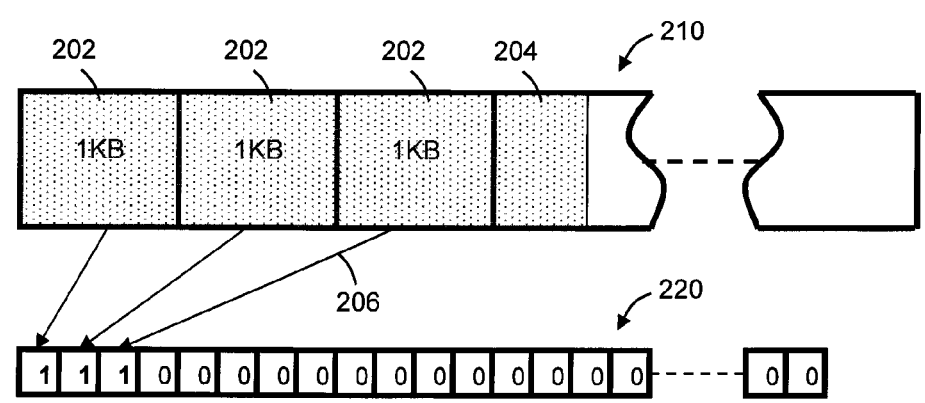
Figure 3:
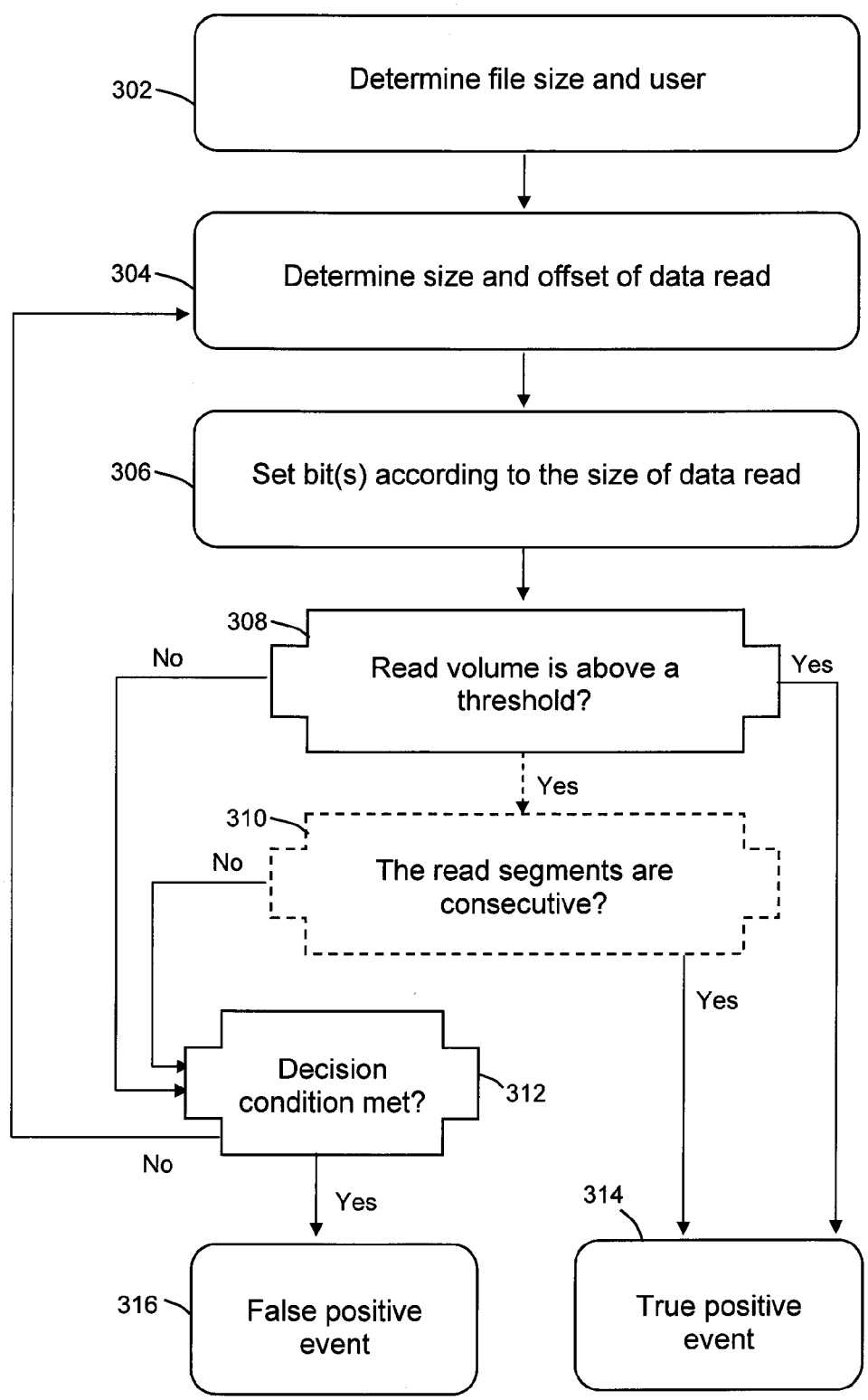

FIG. 1 schematically illustrates a distributed system with a storage component, according to exemplary embodiments of the disclosed subject matter;

FIG. 2 schematically illustrates a file with read segments and an integer with set bits corresponding to the read segments, according to exemplary embodiments of the disclosed subject matter; and FIG. 3 illustrates an outline of operations for determining true and false positive read events, according to exemplary embodiments of the disclosed subject matter.

DETAILED DESCRIPTION

One technical problem dealt by the disclosed subject matter is distinguishing, in a computer system, between deliberate file readings by or on behalf of a user or operator of the computer system, as opposed to other read accesses made by or on behalf of utility or auxiliary programs.

It is assumed, at least according to some observations, that in deliberate file readings by or on behalf of a user, such as for viewing or copying, the entire or at least most of the file is being read. On the other hand, in read accesses made by or on behalf of utility or auxiliary programs only a part or a small percentage of the file is read relative to the file length, such as for a preview or a file access for a search or a directory opening for content or an antivirus access that generally read only portions from a file.

One technical solution according to the disclosed subject matter is a computer system or part thereof storing files or linked to file storage and configured to measure what portion of a file is read.

When a file is being read, one or more read events are generated and length of the file being read, and optionally the offsets in the file, are determined. If the portion of a file that is read is greater then a certain threshold, the read access is regarded a true positive read event; otherwise, the read access is regarded as a false positive read event, and consequently the read events, at least optionally, are ignored.

In some embodiments, the threshold is not absolute but, rather, a function of a factor or factors such as the file size.

In some embodiments, instead of or in addition to determination by a threshold, true and false positive events are regarded as such in case eventually sections or segments of the file were read consecutively without leaving unread segments or the file segments were read intermittently, respectively.

It is noted that, at least in some embodiments, the file storage is a separate component of a larger system, such as a distributed system, and thus the read requests do not provide information on the calling program or other data by which the requesting program or the type of the read access could be determined.

A potential technical effect of the disclosed subject matter is a computer system or a storage system that provides file read events as either true read events or false read events.

The term 'eventually' as used herein implies after the file reading is over and/or after a decision condition is met, the condition decision at least as described later on below.

A general non-limiting overview of practicing the present disclosure is presented below. The overview outlines exemplary practice of embodiments of the present disclosure, providing a constructive basis for variant and/or alternative and/or or divergent embodiments, some of which are subsequently described.

FIG. 1 schematically illustrates a distributed system with a storage component 100 and the rest of the system 120, according to exemplary embodiments of the disclosed subject matter.

Storage component 100 comprises a computer 102 connected to a storage device 104, interacting therebetween as indicated by a double-arrow 106. Computer 102, optionally with additional or auxiliary apparatus, is also denoted as a controller.

Storage component 100, representing any number of storage component 100, is interconnected with rest of the system 120, the latter represents any distributed system, and the interconnection therebetween represented by a double-arrow 108.

In some embodiments, rest of the system 120 sends read requests to storage component 100. The requests are received by computer 102 which forwards the requests to storage device 104 to perform the actual read operations.

In some embodiments, based on the requests, computer 102 receives and/or determines details of the requests, such as what file is to be accessed, offset or offsets from which the file is to be read, the volume of the segments read from the offsets and/or any other information essentially needed to perform a read from storage device 104.

Generally, the contents of the file read from storage device 104 are passed back to rest of the system 120.

Upon completing the requested readings by storage device 104, storage component 100 generates by computer 102 one or more read events distinguishing between true positive read and false positive read events.

In some embodiments, storage component 100 and rest of the system 120 operate according to a scenario as follows.

Since storage component 100 is separate from rest of the system 120, the requests received by storage component 100 include only the essential parameters for the read operation per se, without other information to indicate what program or kind or program or the nature of the program or software or application that initiated the requests.

Without limiting and unless otherwise specified, the scenario above is assumed for the descriptions herein.

In some embodiments, the controller is configured to generate false positive read events and true positive events of reading a file responsive to an amount of data read from the file as described below.

In some embodiments, computer 102 as a chip or electronic board is integrated with storage device 104, yielding forming a 'smart' storage device such as a disk with a smart controller. In some embodiments, computer 102 is remote from storage device 104 and the two apparatuses are linked therebetween.

Generally, a read event is regarded as a true or positive or true positive event when the entire file is read, or at least the most part thereof relative to the file's length and/or, optionally when the file is read consecutively. The consecutive reads are not necessarily consecutive, but, rather, after completing the reading is determined that sections or segments of the file were read without leaving a gap therebetween.

For example:
Open text files, bitmaps, Word, PDF and Excel documents or Notepad.
Open files from a command prompt.

Generally, read event is regarded as a false or false positive event when a portion or some portions of a file is read, at least where the volume of the portion or portions is minor relative to the file's length and/or, optionally, when the file is not read consecutively, that is, the file is read discontinuously.

For example:
Open a directory such when the detail level is set on 'content'.
Right click for properties
Antivirus scan
Searching such as Google® search
Previewing a file In some embodiments, a true positive event is judged or decided when the volume of the portion or portions of a file that are read is above a certain threshold, and/or optionally when the portions are read consecutively. Contrarily, when the volume of the portion or the portions is below the threshold, and/or optionally the portions are discontinuous, the event is judged or decided or regarded as false positive.

In some embodiments, the threshold is determined or is a function of the file size and, optionally or additionally, the threshold is determined based on other factors such as the time between readings of the file.

In some embodiments, the decision or judgment whether a read event from a file is false or true is taken when one or more or any combination of the following conditions is met:
A specific predetermined number of readings from the file
A determined number of readings from the file
A specific predetermined time lapse from the first reading of the file
A determined time lapse from the first reading of the file
A specific predetermined time lapse from the last reading of the file
A determined time lapse from the last reading of the file Optionally, other conditions or combination of conditions may be used, for example, receiving or detecting an event of closing the file. Any condition or any combination thereof are, for brevity and clarity and without limiting, collectively referred to as 'decision condition'.

In some embodiments, determining whether a number of read was completed is performed by assigning an array of buffers and each reading is sequentially filled in the buffers. Once a certain number of buffers are filled a decision condition is met. Optionally, instead of buffers an array of indicators is used, such as an array of bits, and for each reading a corresponding indicator is set and once a certain number of indicators are set a decision condition is met.

In some embodiments, until a decision condition is met a read or event of a file is considered as undecided or ambiguous or indefinite, collectively referred to, without limiting, as 'indefinite'.

Thus, storage component 100, or particularly computer 102, can determine the portion or portions of the file that are read or to be read and, optionally, determine the reading sequence, as well as a decision condition. Accordingly whether the read event is true or false or yet indefinite can be determined.

In some embodiments, the events are formed as a data structure and stored in storage such as a cache, wherefrom the events may be retrieved. The data structure may include one or more items such as one or more of identification of the event, the type of the event in case false evens are also stored, the file name or other items such as the integer describe below.

In some embodiments, the event is generated as a notification either synchronously or asynchronously, such as an interrupt, responsive to which rest of the system or a component thereof retrieves the event.

In some embodiments, read events are stored such as in a database, for example, for further review or analysis.

Optionally the read events are stored with an indication, such as flag, indicating whether the read events are true positive or false positive.

Optionally or alternatively, only the true positive events are stored, thereby reducing processing and/or storage and optionally reducing the amount of data to be further reviewed or analyzed.

In some embodiments, the storage of the events is carried out by storage component 100, or particularly computer 102. Alternatively, in some embodiments, the events are stored by rest of the system 120 or a component thereof, for example, responsive to an event notification.

Optionally or alternatively, in some embodiments, the storage of the events is carried out by a component of rest of the system 120, such as a probe or auxiliary computer that handles the events, optionally as returned from storage component 100 or according to data returned from storage component 100.

In some embodiments, in order to track the portions of a file that are read, a method and accompanying apparatus, such as computer 102, is devised. The method is devised for efficient operation, at least relative to straightforward method of using memory elements such as bytes or words for portions of a file and/or offsets thereof.

In the following discussion, as common in the art, 'B', 'KB', 'MB' and 'GB' represent byte, kilo-byte, mega-byte and giga-byte, respectively.

An integer of 32 bits representing any construct of linearly ordered bits, such as a register, is used to represent the file length, with the bits of the integer representing segments as portions of a file that is read, each bit of the integer representing a segment read from the file.

Initially all the bits of the integer are reset to zero or false state.

When a segment of a file is read, judged, for example, by a byte read from the middle of the respective segment, a corresponding bit is set to one (switched on) as determined according to the length of the file.

For example, if the file size is exactly 32 KB, the middle of the segments of the file would be at 0.5 KB, 1.5 KB, 2.5 KB and so on for the corresponding bits, for instance the 1st bit, 2nd bit, 3rd bit and so on.

Following the example, for each 1 KB read, the corresponding bit is switched on, referred to also as 'hit'.

Thus, if less then 1 KB are read, such as 512 B, then no bit would be switched on for the corresponding segment, that is, no hit occurred. Likewise, if more than 1 KB but less than 2 KB, such as 1280 B, are read then one bit would be switched on, that is a hit has occurred.

In cases or embodiments when the size of the read-buffer used for reading a file is much smaller than the segment size as defined or reflected by the integer, the process as described above yields better results relative to defining a hit for any byte or any elementary unit of the file such as a word, and, in some embodiments, relative to defining a hit for an amount much smaller than a segment size.

As used herein, without limiting, the term 'much smaller' implies a size smaller than 50% of a segment size, for example, about 20%, about 10%, about 5% or any other percentage smaller than 50% of a segment size, and the term 'read-buffer' refers to a memory section of a certain size used in reading files from storage media, typically defined by or through the file system or operating system.

FIG. 2 schematically illustrates a file 210 with read segments marked with a shade, and an integer 220 with set bits corresponding to the read segments as indicated by arrows 206, according to exemplary embodiments of the disclosed subject matter.

Assuming file 210 having 32 KB and segments of 1 KB, first 3 read segments of 1 KB, each labeled as 202, are indicated or tracked as first 3 set bits in integer 220, while a bit for a fourth segment less than 1 KB, labeled as 204, is not set.

As, in some embodiments, a read event is determined as true positive or false positive when the volume of the read segments is above or below a threshold, respectively. Correspondingly, the volume of the read segments is represented by the number of set bits in the integer, and the threshold is represented by a certain number of set bits.

At least in commonly used, a file is not necessarily read serially but rather in various fashions as directed, for example, by the application using the file, a user operating the application or by the file system or operating system. Correspondingly, the set bits in the integer may be in various patters.

Accordingly, in some embodiments, a read event is determined as true positive or false positive when the segments are read successively or non-successively, respectively, and the sequence of the read segments is represented by a series of set bits in the integer.

Optionally or additionally, a read event is determined as true positive if a certain number of bits is set consecutively, regardless of other bits in the integer. Optionally, other rules or procedures may be used to determine or consider true positive or false positive read events, such as the Hamming weight.

In some embodiments, the integer described above and/or another integer and/or another construct is used for determining a decision condition, such as by determining the number of readings from a file.

Generally, true read event is decided when a significant portion of a file relative to the file size is read, where what is considered as significant depends on or is according to certain conditions. Generally, without limiting, a significant portion is such that the larger the file size the smaller size or smaller percentage of the file size is the significant portion and, vice versa, the smaller the file size the larger size or larger percentage of the file size is the significant portion.

In some embodiments, a significant portion is determined by a threshold, where, in some embodiments, the threshold is obtained according to a formula and/or a lookup table.

For example in some embodiments, the threshold is determined according to the following formula (I).

$$T = \max(1, \min(32, 32 - 16 * \log(K_2/K) * S/K)) \quad (1)$$

Where:

T—the threshold in KB

K—the minimum file size for which the entire file is read and/or to be read in KB $K_2$—the minimum file size for which half of the file is read and/or to be read in KB S—the actual file size in KB Table-1 below illustrates some determined threshold according to formula (I) above.

TABLE 1

| S (file size) | T (Threshold) | Portion read from the file |
|---|---|---|
| 8 KB | 32 | 100% |
| 16 KB | 32 | 100% |
| 32 KB | 29 | 81% |
| 64 KB | 26 | 75% |
| 128 KB | 24 | 87% |
| 1 MB | 16 | 50% |
| 4 MB | 10 | 31% |
| 16 MB | 5 | 15% |
| 256 MB | 1 | 3% |
| 1 GB | 1 | 3% |
| 4 GB | 1 | 3% |

TABLE 1-continued

| S (file size) | T (Threshold) | Portion read from the file |
|---|---|---|
| 16 GB | 1 | 3% |
| 64 GB | 1 | 3% |

The method and apparatus described above are non-limiting exemplary ones and other variations thereof or other methods or apparatus may be used, such as using different formulas or devising procedures with conditional logic or using lookup tables, optionally with interpolations.

For example, an integer or other data constructs of more or less than 32 bits, different logical values for set and non-set bits, different relations between a bit and a corresponding segment, such as where some bits represent segments of different sizes according to the position of the segment in the file or according to the context or type of file that is read, if known, such as data, folder or system file, or a directory or a registry. Optionally other constructs may be used instead of an integer, such as an array of bytes or a stack.

FIG. 3 illustrates an outline of operations for determining true and false positive read events, according to exemplary embodiments of the disclosed subject matter.

Without limiting, an integer as described above is referred to in the description below.

Upon receiving a read request, such as from rest of the system 120, at 302 the files file is determined in terms of size and the user that reads the file and optionally the file name. Optionally or additionally, the bits of the integer are cleared or reset or set to false.

At 304 the size and offset of data read from the file are determined such as responsive to a reading, and at 306 bit or bits of the integer are is or are according to the size of data read.

At 308 the read volume is checked whether the volume is above a threshold. If true a true positive read event is decided at 314. Optionally, at 310, in order to decide a true positive read event, a check whether the readings were made consecutively is made at 310. If true then a true positive read event is decided at 314, otherwise a check whether a decision condition is met is made at 312, such as whether sufficient data was read. If true, a true positive read event is decided at 314. Otherwise the read event is indefinite and at 304, such as responsive to a reading, data size read and offset thereof are determined again.

If at 308 the read volume is not above a threshold then a check whether a decision condition is met is made at 312. If true, a false positive event is decided at 316, otherwise the read event is indefinite and at 304, such as responsive to a reading, data size read and offset thereof are determined again.

In some embodiments, after a true or false read event is decided, the integer is reset.

in some embodiments, regardless of or skipping the check by threshold, if the read segments are eventually consecutive the read event is regarded as true positive, otherwise as false positive.

It is noted that consecutive segments are regarded as such when eventually it is determined or realized that the sections or segments of the file were eventually read consecutively, not necessarily read as such during the read operations.

In some embodiments, the threshold is determined according to parameters such as the file size and/or part thereof.

In some embodiments, at 304 the read data and offset are determined responsive to a read event. Optionally or additionally, the read data and offset are periodically checked for whether a reading has occurred.

In the description above, a read item such as read data is to be interpreted also or alternatively as to be read.

According to exemplary embodiments of the discloses subject matter is provided a computerized method for distinguishing between false positive read events and true positive events of reading a file, comprising, determining an amount of data read from the file; and in case the amount of data read from the file exceeds a threshold generating a true positive read event, otherwise generating a false positive read event in case a decision condition is met.

In some embodiments, the decision condition comprises one or more of: a specific predetermined number of readings from the file, a determined number of readings from the file, a specific predetermined time lapse from the first reading of the file, a determined time lapse from the first reading of the file, or any combination thereof.

In some embodiments, the threshold is determined according to at least the size of the file.

In some embodiments, the threshold is determined according to a formula, a lookup table, or a combination thereof.

In some embodiments, the formula is:

$$T=\max(1,\min(32,32-16*\log(K2/K)*S/K))$$

Wherein:
T is the threshold in KB,
K is the minimum size of file for which the entire file is read in KB;
K2 is the minimum size of the file for which half of the file is read in KB; and
S is the actual size of the file in KB.

In some embodiments, the method further comprises generating the true positive read event if sequential segments of the file were read, otherwise generating the false positive read event.

Thus according to exemplary embodiments of the discloses subject matter is provided a computerized method for distinguishing between false positive read events and true positive events of reading a file, comprising generating a true positive read event if sequential segments of the file were read, otherwise generating a false positive read event.

Thus according to exemplary embodiments of the discloses subject matter is provided a computerized apparatus for distinguishing between false positive read events and true positive events of reading a file, comprising a data storage device storing the file therein, and a controller linked to the data storage device, the controller configured to generate false positive read events and true positive events of reading the file responsive to an amount of data read from the file.

In some embodiments, the controller determines false positive read events and true positive events responsive to whether the amount of data read from the file exceeds a threshold, respectively.

In some embodiments, the controller determines false positive read events in case a decision condition is met.

In some embodiments, the controller determines false positive read events and true positive events responsive to whether data is eventually read sequentially, respectively.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable to controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a similar one denotes an apparatus having one or more processors operable or operating according to a program.

As used herein, without limiting, a module represents a part of a system such as a part program operating together with other parts on the same unit, or a program component operating on different unit, and a process represents a collection of operations for achieving a certain outcome.

The term configuring for an objective or a variation thereof implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated operations may occur in deferent order or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When a range of values is recited, it is merely for convenience or brevity and includes all the possible sub ranges as well as individual numerical values within and about the boundary of that range. Any numeric value, unless otherwise specified, includes also practical close values enabling an embodiment or a method, and integral values do not exclude fractional values. A sub range values and practical close values should be considered as specifically disclosed values.

Unless otherwise specified, the terms 'about' and/or 'close' with respect to a numerical value implies within an inclusive range of −10% to +10% or the respective value.

The terminology used herein is for the purpose of describing particular embodiments only and is not intended to be limiting of the disclosed subject matter. While certain embodiments of the disclosed subject matter have been illustrated and described, it will be clear that the invention is not limited to the embodiments described herein. Numerous modifications, changes, variations, substitutions and equivalents are not precluded.

The invention claimed is:

1. A computerized method for distinguishing between false positive read events and true positive events of reading a file, comprising:
    monitoring access to a file stored on a data storage device by a computer system serving as a controller;
    determining an amount of data read from the file during the access to the file and subsequent access to the file until a decision condition is met causing the controller to provide an indication if the access to the file is a false positive read event or a true positive read event; wherein if the amount of data read from the file exceeds a threshold value a true positive read event indication is generated, otherwise a false positive read event indication is generated,
    wherein the threshold is determined according to a formula:
    $T=\max(1,\min(32,32-16*\log(K_{.sub.2}/K)*S/K))$ wherein: T is the threshold in KB, K is the minimum size of file for which the entire file is read in KB; $K_{.sub.2}$ is the minimum size of the file for which half of the file is read in KB; and S is the actual size of the file in KB.

2. The computerized method for distinguishing between false positive read events and true positive events of reading a file according to claim 1, wherein the decision condition comprises one or more of: a specific predetermined number of readings from the file, a determined number of readings from the file, a specific predetermined time lapse from the first reading of the file, a determined time lapse from the first reading of the file, or any combination thereof.

3. The computerized method for distinguishing between false positive read events and true positive events of reading a file according to claim 1, wherein the threshold is determined according to at least the size of the file.

4. The computerized method for distinguishing between false positive read events and true positive events of reading a file according to claim 1, further comprising generating the true positive read event indication if sequential segments of the file were read in subsequent accesses.

5. A computerized apparatus for distinguishing between false positive read events and true positive events of reading a file, comprising:
    a data storage device storing the file therein; and
    a controller linked to the data storage device, the controller configured to:
        monitor access to the file stored on the data storage device;
        determine an amount of data read from the file during the access to the file and subsequent access to the file until a decision condition is met causing the controller to provide an indication if the access to the file is a false positive read event or a true positive read event; wherein if the amount of data read from the file exceeds a threshold value a true positive read event indication is generated, otherwise a false positive read event indication is generated, wherein the threshold is determined according to a formula:

$$T = \max(1, \min(32, 32 - 16 * \log(K_2/K) * S/K))$$

wherein: T is the threshold in KB, K is the minimum size of file for which the entire file is read in KB; $K_2$ is the minimum size of the file for which half of the file is read in KB; and S is the actual size of the file in KB.

6. The computerized apparatus for distinguishing between false positive read events and true positive events of reading a file according to claim 5, wherein the controller determines false positive read events and true positive events responsive to whether sequential segments of the file were read in subsequent accesses.

* * * * *